United States Patent
Kalgi et al.

(10) Patent No.: US 9,313,215 B2
(45) Date of Patent: Apr. 12, 2016

(54) MONITORING AND LIMITING REQUESTS TO ACCESS SYSTEM RESOURCES

(71) Applicant: VISA INTERNATIONAL SERVICE ASSOCIATION, San Francisco, CA (US)

(72) Inventors: Avinash Kalgi, Kirkland, WA (US); Adam Conway, Snoqualmie, WA (US); Galina Skoptsova, Seattle, WA (US); Mark Cordell, Bellevue, WA (US)

(73) Assignee: Visa International Service Association, San Francisco, CA (US)

( * ) Notice: Subject to any disclaimer, the term of this patent is extended or adjusted under 35 U.S.C. 154(b) by 515 days.

(21) Appl. No.: 13/626,063

(22) Filed: Sep. 25, 2012

(65) Prior Publication Data

US 2013/0086258 A1    Apr. 4, 2013

Related U.S. Application Data

(60) Provisional application No. 61/539,379, filed on Sep. 26, 2011.

(51) Int. Cl.
*H04L 29/06* (2006.01)
*G06Q 30/02* (2012.01)
*G06F 21/60* (2013.01)
*G06F 21/31* (2013.01)
*G06Q 20/10* (2012.01)

(52) U.S. Cl.
CPC ............ *H04L 63/1408* (2013.01); *G06F 21/31* (2013.01); *G06F 21/604* (2013.01); *G06Q 30/0261* (2013.01); *G06Q 20/10* (2013.01)

(58) Field of Classification Search
None
See application file for complete search history.

(56) References Cited

U.S. PATENT DOCUMENTS

| 7,232,063 B2 | 6/2007 | Fandel et al. |
| 7,350,007 B2 | 3/2008 | Depew et al. |

(Continued)

FOREIGN PATENT DOCUMENTS

KR    10-2008-0079343 A    9/2008

OTHER PUBLICATIONS

International Search Report and Written Opinion dated Mar. 29, 2013, from International Patent Application No. PCT/US2012/057026, 8 pages.

*Primary Examiner* — Ranodhi Serrao
*Assistant Examiner* — James Fiorillo
(74) *Attorney, Agent, or Firm* — Kilpatrick Townsend & Stockton LLP (57) ABSTRACT

Systems, apparatuses and methods for preventing requests to access a system's resources from having a negative impact on higher priority data processing operations being performed by the system. The invention is directed to preventing the number of calls made by a merchant's applications through an application programming interface (API) for access to the lower priority services of a merchant service provider from having a negative impact on the ability of the service provider to perform the processing necessary to support higher priority services. The invention provides a user interface that may be used by a merchant or the service provider to configure the operation of a "throttle" that is designed to generate an alert when the number of calls by a merchant application for access to a specific service provider function or application exceeds a value or limit, where exceeding the value or limit may indicate a malfunction of the merchant's application or an attack by a malicious agent.

16 Claims, 6 Drawing Sheets (56) References Cited

U.S. PATENT DOCUMENTS

| | | | |
|---|---|---|---|
| 7,536,715 B2 | 5/2009 | Markham | |
| 7,634,542 B1 | 12/2009 | Krause et al. | |
| 7,941,370 B2* | 5/2011 | Paulsen | G06Q 20/02 705/1.1 |
| 2004/0024817 A1 | 2/2004 | Pinkas | |
| 2004/0093303 A1* | 5/2004 | Picciallo | G06Q 20/04 705/39 |
| 2007/0073615 A1 | 3/2007 | Marchesi | |
| 2008/0103972 A1 | 5/2008 | Lanc | |
| 2009/0099965 A1* | 4/2009 | Grant, IV | G06Q 40/00 705/41 |
| 2009/0307353 A1 | 12/2009 | Felton et al. | |
| 2010/0280946 A1* | 11/2010 | Batten | G06Q 20/02 705/42 |
| 2011/0202413 A1* | 8/2011 | Stewart | G06Q 20/10 705/16 |
| 2011/0217994 A1* | 9/2011 | Hirson | G06Q 20/12 455/466 |
| 2012/0180021 A1* | 7/2012 | Byrd | G06F 21/604 717/100 |
| 2013/0006816 A1* | 1/2013 | Nuzzi | G06Q 30/0261 705/27.1 |
| 2013/0269041 A1* | 10/2013 | Hill | G06F 21/31 726/28 |
| 2014/0031024 A1* | 1/2014 | Xie | G06F 21/57 455/418 |
| 2014/0279533 A1* | 9/2014 | Hamilton | G06Q 40/00 705/44 |

* cited by examiner

MONITORING AND LIMITING REQUESTS TO ACCESS SYSTEM RESOURCES

CROSS-REFERENCES TO RELATED APPLICATIONS

This application is a non-provisional of and claims the benefit of the filing date of U.S. Provisional Patent Application No. 61/539,379, filed on Sep. 26, 2011, which is herein incorporated by reference in its entirety for all purposes.

BACKGROUND

In some instances, a merchant service provider may operate a server or servers that process payment transactions that are conducted by consumers with merchants. The merchant service provider may communicate with the merchant's client-side device or devices using a communications network such as the Internet. A merchant's device(s) may execute one or more applications that interact with the merchant service provider. Such applications may include a "shopping cart" to enable consumers to select and purchase goods or services, a point of sale terminal application for conducting a transaction to provide payment for goods or services, a reporting application to generate a report on the transactions conducted with the merchant, an accounting application, etc. The merchant applications may provide data to the merchant service provider, and typically are also able to request information or cause the performance of some function or operation by the merchant service provider. The requests are typically contained in "messages" and provided to the merchant service provider via an application programming interface (API) that the merchant service provider exposes to the merchant (and hence to the merchant's applications). The API (or APIs) permit communication between the merchant's data processing system and that of the merchant service provider, by allowing applications executed by the merchant to initiate specific data processing tasks that are executed by the merchant service provider.

In a typical situation, an application executing on a merchant's device may issue a request or "call" for some function to be performed by an application executing on a server operated by the merchant service provider. For example, the merchant's device may send a message to the merchant service provider that includes a request to process a payment transaction (e.g., by indicating a name or identification for a process or application to be executed, along with the relevant transaction data). This allows the merchant's data processing system to communicate with the merchant service provider to initiate a desired operation.

However, a problem can arise if a merchant generates an excessive number of requests for data or functions from the merchant service provider, where the number, rate, or some other characteristic of the requests is sufficient to have a negative impact on the ability of the merchant service provider to perform its higher priority processing tasks. For example, intentionally or as the result of a malfunction, a merchant application may generate a large number of requests for report generating functions or other forms of administrative "housekeeping". Responding to these requests can cause the merchant service provider to experience delays or errors in performing its higher priority processing tasks, such as processing payment transactions (or other revenue producing activities) for that merchant or for other merchants. This is an undesirable use of the data processing resources provided by the merchant service provider as both the merchant, the merchant service provider, and even perhaps other affected merchants (whose processing tasks are impacted by the allocation of resources to processing lower priority requests generated by the first merchant) will generally prefer that data processing resources be allocated to the processing of higher priority tasks.

What is a desired is a system, apparatus, and method for preventing an excessive use of resources by a user of an merchant service provider's data processing system. Embodiments of the invention address this and other problems both individually and collectively.

BRIEF SUMMARY

Embodiments of the invention relate to systems, apparatuses and methods for preventing requests to access a system's resources from having a negative impact on higher priority data processing operations being performed by the system. In some embodiments, the invention is directed to systems, apparatuses and methods for preventing the number of calls made by a merchant's applications through an application programming interface (API) for access to the lower priority services of an merchant service provider ("service provider") from having a negative impact on the ability of the service provider to perform the processing necessary to support higher priority services. In some embodiments, the invention provides a user interface that may be used by a merchant or the service provider to configure the operation of a "throttle" that is designed to generate an alert when the number of calls by a merchant application for access to a specific service provider function or application exceeds a value or limit, where exceeding the value or limit may indicate a malfunction of the merchant's application or an attack by a malicious agent.

Embodiments of the invention may be used In an environment where merchant applications (e.g., POS applications, reporting applications, etc.) are permitted to submit calls (e.g., "run transaction" call, "get report" call, etc.) to a merchant service provider's servers. In such a situation there is a risk that the servers may become overloaded when an unintentional error or a denial-of-service attack causes a merchant application to make an unreasonably high number of calls. For example, a malfunctioning merchant application might generate "get report" calls at a rate of 10 times per second, which in turn causes the merchant service provider's servers to try to download a report 10 times per second. This may understandably interfere with the performance of higher priority tasks for that merchant, such as the processing of payment transactions.

Embodiments of the invention may include a centralized server that detects when a particular call from a particular application of a particular merchant (or other desired level of granularity) exceeds a threshold and then generates an alert or indicates an alarm or error. Because detection may occur at the "per merchant, per application, per call" level, the central server is able to shut off (or otherwise cease devoting resources to the processing of) the particular call from the particular application of that merchant, and thereby permit the merchant's other applications to continue making calls that are serviced. Accordingly, the merchant service provider does not have to completely deny data processing services to the merchant. It should be appreciated that the number of incoming requests or calls is determined/detected on a configurable sampling interval, such as per second.

As discussed, enabling merchant-specified limits/thresholds is beneficial to the merchant service provider because it provides a way for the service provider to limit the number of non-revenue generating calls (e.g., "run report" calls) so as to ensure adequate bandwidth for revenue generating calls (e.g., "run transaction" calls from POS applications). This enables the merchant service provider to avoid situations where its servers cannot process payment transactions because its servers are too busy downloading reports.

A merchant knows its own operational characteristics well and can therefore optimally set its own configuration parameters. For example, a merchant may use the user interface to set three different thresholds: 60 "run transaction" calls per second for its POS application, 30 "subscription request" calls per second for its customer on-boarding application, and one "run report" call per second for its accounting application. In operation, if the merchant service provider receives a particular call at a rate that exceeds the corresponding merchant-specified threshold, then something may be wrong with the merchant application and the merchant service provider can throttle down or deny the particular calls and/or send the merchant an alert or error message specifying the call and the application. Enforcing merchant-specified thresholds enables the merchant service provider to protect its servers from overload, while at the same time providing merchants with the benefit of receiving notice when one or more of its applications are malfunctioning or under attack.

According to some embodiments, each call received by the API of the service provider will include information that may be used to identify the merchant from whom the call is originating and the specific merchant application (or merchant application function) that is the source of the call. This enables the service provider to determine when a specified limit or constraint has been exceeded and in response to alert the merchant and take any desired remedial actions (such as delaying processing of those calls, suspending some or all processing for a period of time, terminating all lower priority processing of calls or requests for a period of time before restoring that processing for a merchant, etc.). Thus embodiments of the invention may be used to provide load balancing functions as well as to generate alerts in the event of a malfunction of a merchant's transaction processing systems or an attack by a malicious agent. Further, as noted, embodiments of the invention may be used by a merchant or service provider to determine the desired allocation of data processing resources to servicing of requests from the merchant. This may be based on what total processing bandwidth is available to the merchant as the result of a contract with the service provider.

Note that the described limits or constraints may be set by a merchant to control allocation of the service provider's data processing resources to those tasks that the merchant desires to have assigned a relatively higher priority (e.g., by assigning a limit to the number of lower priority requests from the merchant that are serviced by the service provider). This might include payment transactions as the highest priority, with administrative or other "housekeeping" tasks as a lower priority. As described, the limits or constraints may also be set by a merchant to provide an indication to the merchant and/or to the service provider of when a merchant application is operating in a way that might indicate a malfunction (e.g., by issuing an abnormally high number of requests for a specific task). Further, a merchant may use an embodiment of the invention to set limits or constraints on the requests or communications received from a source outside the merchant (such as the service provider) to provide a way to control the allocation of the merchant's data processing resources to processing the received communications.

Similarly, the service provider may use embodiments of the invention to set limits or constraints on the requests or service calls received from one or more merchants (either individually or as a group) to provide control over the allocation of the service provider's data processing resources. This can be done to ensure that those resources are utilized in a desired manner (such as to process revenue generating requests as the highest priority and to service lower priority requests in a way that does not impact the revenue generating activities). In this use of the invention, the available data processing capability of the service provider may be used as the basis for setting the limits or constraints by taking into account the number and types of requests or service calls received, the amount of data processing capabilities required to service different types of calls, the amount of data processing resources that the service provider desires to allocate to a specific merchant based on an agreement with that merchant, etc.

One embodiment of the invention is directed to a method of processing requests at a merchant service provider, the requests received from one or more merchant-side applications of a merchant, the method comprising: providing, by the merchant service provider, the merchant with an interface having one or more controls to permit the merchant to assign a request limit to at least one of the one or more merchant-side applications, the request limit being a limit on the number of requests the merchant service provider will process; counting, by the merchant service provider, incoming requests from the one or more merchant-side applications of the merchant; and generating, by the merchant service provider, an alert if a number of requests from at least one of the one or more merchant-side applications exceeds the request limit.

Another embodiment of the invention is directed to a system comprising a processor, and a computer readable medium coupled to the processor, the computer readable medium comprising code for implementing a method of processing requests at a merchant service provider, the requests received from one or more merchant-side applications of a merchant, the method comprising: providing, by the merchant service provider, the merchant with an interface having one or more controls to permit the merchant to assign a request limit to at least one of the one or more merchant-side applications, the request limit being a limit on the number of requests the merchant service provider will process; counting, by the merchant service provider, incoming requests from the one or more merchant-side applications of the merchant; and generating, by the merchant service provider, an alert if a number of requests from at least one of the one or more merchant-side applications exceeds the request limit.

Yet another embodiment of the invention is directed to a computer-readable storage medium, comprising: program code for providing a merchant with an interface having one or more controls to permit the merchant to assign a request limit to at least one of one or more merchant-side applications, the request limit being a limit on the number of requests a merchant service provider will process; program code for counting incoming requests from the one or more merchant-side applications of the merchant; and program code for generating an alert if a number of requests from at least one of the one or more merchant-side applications exceeds the request limit.

DETAILED DESCRIPTION

Embodiments of the invention may be used to monitor the number, rate, or other characteristics of requests or calls made by one or more merchant applications to a service provider to ensure that requests for non-essential or lower priority services do not cause a disruption in the processing of higher priority services, such as payment transactions or other services that generate revenue. For example, when the number or rate of calls or requests for a lower priority data processing service exceed a threshold value, an alert may be generated and all subsequent such calls or requests may be rejected or processed at a reduced rate so as to comply with the threshold value. The merchant may be notified and in response conduct an investigation to determine if there is a malfunction within the merchant's data processing system or if the calls or requests were generated as part of a malicious act. In some embodiments, a merchant may be provided with a user interface that permits the merchant to assign limits or threshold values to the number or rate of calls generated by one or more merchant-side applications before an alert is generated. In some embodiments, the merchant may assign limits or threshold values to the number or rate of calls generated by specific functions or processes of each application.

In operation, embodiments of the invention may provide the following benefits: (1) for a given merchant or user, a service provider may use embodiments of the invention to prevent requests or "calls" made to lower priority services from impeding the processing of higher priority services for that merchant or for other customers of the service provider; (2) providing an indication to the service provider and/or to the merchant if a merchant's operations are not functioning properly (because they are generating an excessive number of calls) or have been the subject of a form of denial of service attack that is intended to harm the operations of the merchant or service provider; (3) permitting a merchant or user to specify constraints on how data processing resources are allocated by the service provider to tasks performed for that merchant in order to retain the capacity to perform the higher priority services for the merchant; (4) preventing servicing requests from one merchant from impacting the availability of resources used to service requests from other merchants; and (5) permitting a merchant or user to specify constraints on requests sent from its own applications in order to control the allocation of its own resources to ensure that its systems are used in a desired manner.

A common aspect of many systems that provide services to merchants is to enable the merchants to access certain system resources in order to obtain data, request a report, obtain records, etc. This may be done by providing the merchants' applications with access to the resources by means of an application programming interface (API) that exposes certain functions or capabilities of the service provider to the merchant's applications. For example, a service provider that provides data processing services to a group of merchants may permit those merchants to execute applications which operate to request or "call" certain resources of the service provider's data processing system. Such applications might function to request records of processed transactions, to generate a report in a specified format that provides details regarding the processed transactions, to trigger the processing of a new transaction, to register a new consumer account, etc.

However, not all of the requests made by merchants to the service provider's system are of equal importance to the service provider or to the merchants. For instance, while some requests might generate revenue for the service provider and/or the merchants, others may be more of an administrative nature and not generate revenue. If an error occurs within one of the merchant applications (such as a repeated "loop" of certain operations), it may result in an excessive number of calls to the service provider system for lower priority services, thereby negatively impacting the primary data processing functions the system is supposed to perform. In addition, if a malicious agent desires to launch a denial-of-service type attack on the service provider, it might do so by causing the merchant applications to generate an excessive number of requests. Such an excessive number of requests, whether intentional or not, can lead to a reduction in the ability of the service provider's data processing system to perform its primary functions, such as the processing of payment transactions for the merchant that is the source of the requests. It may also lead to a reduction in the ability of the service provider to process transactions for other merchants because of the burden placed on its data processing system by servicing the lower priority requests of the merchant that is the source of those requests. These problems can result in a reduction in revenue for the service provider and/or for the affected merchants, both of whom rely on the processing of payment transactions to generate revenue. An excessive number of lower priority requests may also provide an opportunity to attempt to conduct one or more fraudulent transactions, and in any case may cause a reduction in the responsiveness of the data processing system to its primary tasks.

Typically, the merchant is the most knowledgeable party regarding the "normal" operation of their internal systems and applications, and they are presumed to be the party who is most likely to be able to determine what number or rate of requests to access certain service provider resources would be considered unusual or indicative of a malfunction of their own systems. Similarly, the service provider receives the resource requests and hence is the party that is in position to know how many requests are made by each merchant application. This means that in some cases, in order to properly determine if the number, rate, or characteristic of a group of requests from a merchant to a service provider are unusual or indicative of a problem, information from both parties may be needed.

Figure 1:
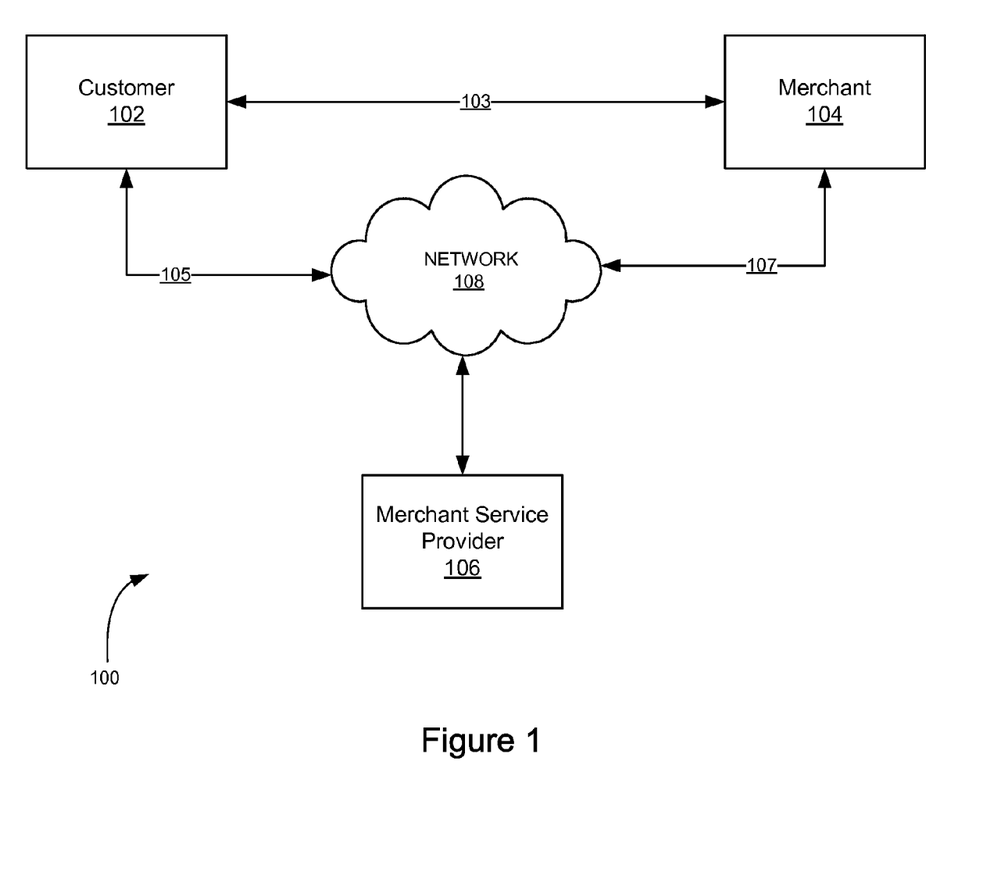
FIG. 1 is a block diagram of an example of an operating environment in which embodiments of the invention can be implemented, in accordance with some embodiments of the present invention.

FIG. 1 is a block diagram of an example of an operating environment 100 in which embodiments of the invention can be implemented. FIG. 1 depicts a customer 102, a merchant 104, and a merchant service provider 106 ("service provider"), communicatively connected through a network 108 (e.g., a communications network such as the Internet). The environment illustrated in FIG. 1 is sometimes referred to as a hosted service environment, wherein the service provider 106, acting as a "host", hosts services for clients, such as the merchant 104. The merchant 104 can transmit information associated with electronic transactions conducted by the customer 102 to the service provider 106. The service provider 106 performs one or more services based at least on the transaction information received from the merchant 104.

The customer 102 is, generally, any entity that is a purchaser of products or services via an electronic transaction. Non-limiting examples include a person who purchases or licenses goods at a retail store using a credit card, a person who purchases or licenses goods through the public Internet, such as buying items online from an electronic commerce company, and a business representative who purchases a business commodity or service through the public Internet. The merchant 104 is, generally, any entity that offers goods or services in exchange for value.

The service provider 106 is a third party, other than the customer and merchant, that provides services in support of the processing of electronic transactions. Non-limiting examples of such services include services related to payment acceptance processing, credit card authorization, risk evaluation and management, fraud screening, tax calculation, export compliance verification, delivery address verification, Internet and/or e-mail address verification, payment crediting, billing, and the like. The service provider 106 may invoke service features of other service providers in support of their service offerings. The network 108 is any private or public network, or a combination of private and public networks, including the Internet, a cellular network, an intranet, a local area network, a wide area network, a wireless data network, or any other such network or combination thereof. For example, the network 108 may comprise the public Internet or the PSTN (Public Switched Telephone Network).

The customer 102 and the merchant 104 may communicate directly, such as at a point of purchase, as represented by link 103. Alternatively, the customer 102 and the merchant 104 may communicate indirectly through the network 108 as represented by links 105 and 107, such as with Internet-originated transactions. As part of a purchasing process, certain information is collected from the customer 102 by the merchant 104 or an associated agent. Non-limiting examples of information collected from the customer 102 include information about the credit or bank card used for the transaction, the item purchased, and shipping and billing addresses.

Once various transaction and customer related information is collected by the merchant 104, the merchant transmits at least a portion of the information to the service provider 106 through the network 108. The merchant 104 may collect information from the customer 102 and submit the collected information to the service provider 106. Although not limited to any specific information, the types of information described above are referred to collectively herein as "transaction information." Any or all of the information referenced above, which is transmitted from a merchant 104 to a service provider 106, may be transmitted through network 108 using any suitable protocol. An example of a suitable protocol is the Simple Object Access Protocol.

The service provider 106 performs one or more services in relation to the electronic commercial transaction associated with the transmitted transaction information. For example, the service provider 106 may process data related to transactions conducted by a plurality of customers with a plurality of merchants in order to prepare that transaction data for further processing by a payment processing network (such as one operated by Visa), such as to format the data for use by the payment processing network as part of a transaction authorization process.

In addition, the service provider 106 may provide other services or functionality to a merchant, such as the ability to request generation of a report, to request information regarding a customer, to request a list of processed transactions, to access financial data, etc. A request to process a payment transaction or to access such other services or functionality may be generated by an application executed by a merchant and communicated over a suitable communications network to the service provider 106, with such a request typically being provided using an application programming interface (API) which is coupled to one or more executable functions or applications of the service provider 106. However, as noted, in some situations the number, rate, or other characteristics of such requests may result in a negative impact on the data processing services provided by the service provider 106 to one or more merchants that are used to process payment transactions or other relatively high priority tasks.

Figure 2:
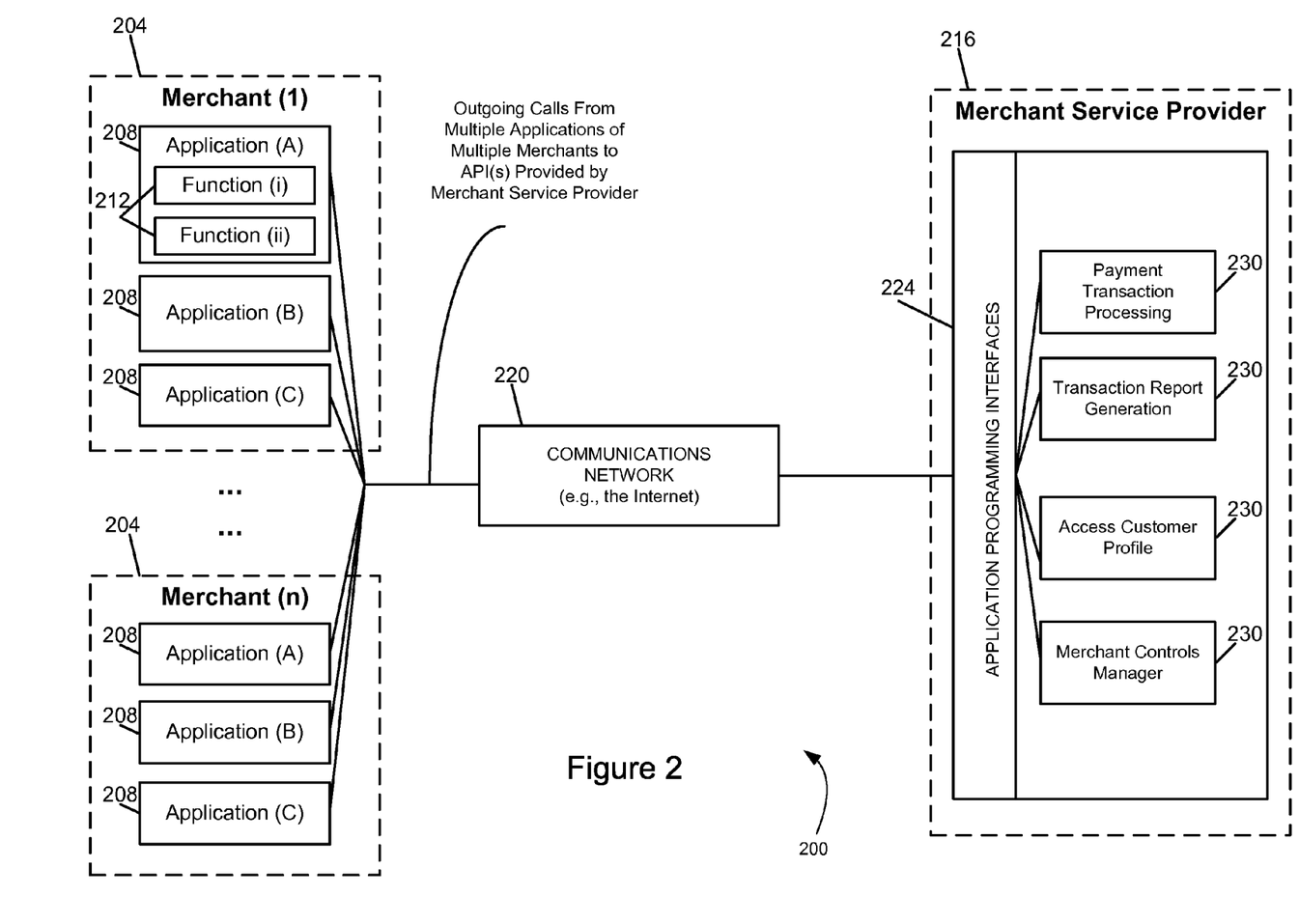
FIG. 2 is a block diagram illustrating the generation of calls or requests to data processing services provided by an merchant service provider by one or more merchants, where each merchant may execute one or more applications, in accordance with some embodiments of the present invention.

FIG. 2 is a block diagram illustrating the generation of calls or requests to data processing services provided by a merchant service provider by one or more merchants, where each merchant may execute one or more applications. As shown in environment 200, one or more merchants 204 may run or execute a set of applications 208, some of which having one or more functions 212. Application (A) having Function (i) and Function (ii), Application (B), Application (C) and are illustrated in the figure, although a greater or lesser number of applications having any number of functions are possible and considered to be within the underlying concepts of the invention. Examples of such applications include a "shopping cart", an eCommerce transaction processing application, a point of sale terminal application that requests processing of a payment transaction conducted using the terminal, a report generating application, an accounting application, a database management application, etc. Examples of such functions include "GetTransactionDetail", "GetTransactionReport", and "CreateTransaction" functions, as well as a "CreateARB-Subscription" function, where ARB is Automated Recurring Billing. Another example is a "CreateCIMProfile" function, where CIM is Customer Information Manager.

Each application 208 (or function 212 thereof) run or executed by each merchant 204 may be the source of one or more function "calls", service requests, data requests, or other form of a request for the data processing capabilities of the merchant service provider 216. These calls, service requests, etc. are communicated to the service provider 216 over a communications network 220 such as the Internet. The calls, requests, etc. are typically provided to the service provider 216 using one or more application programming interfaces (APIs) 224, which function to "expose" certain processing capabilities of the service provider 216 to the merchants 204. The API (or APIs) 224 exposed by the service provider 216 enable a merchant 204 to access the functionality (or cause the execution) of one or more applications or services 230 hosted by the service provider. Examples of such applications or services 230, as shown in FIG. 2, are "Payment Transaction Processing", "Transaction Report Generation", "Access Customer Profile" and "Other Processing Functions".

However, as noted, the number, rate, or another characteristic of the calls, service requests, etc. that a merchant 204 makes to the service provider 216 may have a negative impact on the operation of the service provider 216. For example, if a merchant 204 issues a large number of calls or requests for lower priority (e.g. non-essential or non-revenue generating)

services 230, then the service provider 216 may be delayed in processing the payment transactions being conducted with that merchant 204 or with other merchants 204. Further, the large number of calls or requests may indicate a malfunction with the merchant application 208 or function 212 thereof generating the calls or requests, or suggest that a malicious agent has launched a denial-of-service type attack against the merchant 204 or service provider 216.

As recognized by the inventors, one approach to providing a solution to this problem is to set a limit or other form of constraint on the calls or requests that a particular merchant 204 can make for access to resources or services 230 of the service provider 216. The limit or constraint may represent a number of calls, a rate or calls, or another relevant characteristic. The limit or constraint may be represented as a single number, a range of numbers, etc. If the limit or constraint is exceeded (or if another suitable criteria is met, such as if the rate of change of the limit or constraint exceeds some amount) then an alert may be generated. The alert may be provided to the merchant 204 and/or to the service provider 216. In response to the generation of the alert, some or all of the data processing operations performed by the service provider 216 for the merchant 204 may be delayed, stopped, or otherwise impacted. For example, if the merchant 204 is executing multiple applications 208, then the one (or ones) of the application 208 or functions 212 thereof responsible for exceeding the limit or constraint may be temporarily denied access to the service provider 216 services 230 (i.e., requests from those applications may be rejected) while the service provider 216 continues to process requests from that merchant 204 for higher priority services 230.

Further, as also recognized by the inventors, it may be desirable to set such a limit or constraint at a finer level than a per-merchant level. For example, it may be desirable and provide better control over the efficient allocation of data processing resources (and a better indication of a malfunction) to set such a limit or constraint on a per-application level for each merchant 204. It may further be desirable to set such a limit or constraint on a per-function level for each application 208 that is capable of generating a call or request and that is executed by each merchant, where per-function level is intended to refer to each operation or process ("function 212) that an application 208 executes that can result in a call or request to the resources or services 230 provided by the service provider 216.

Figure 3:
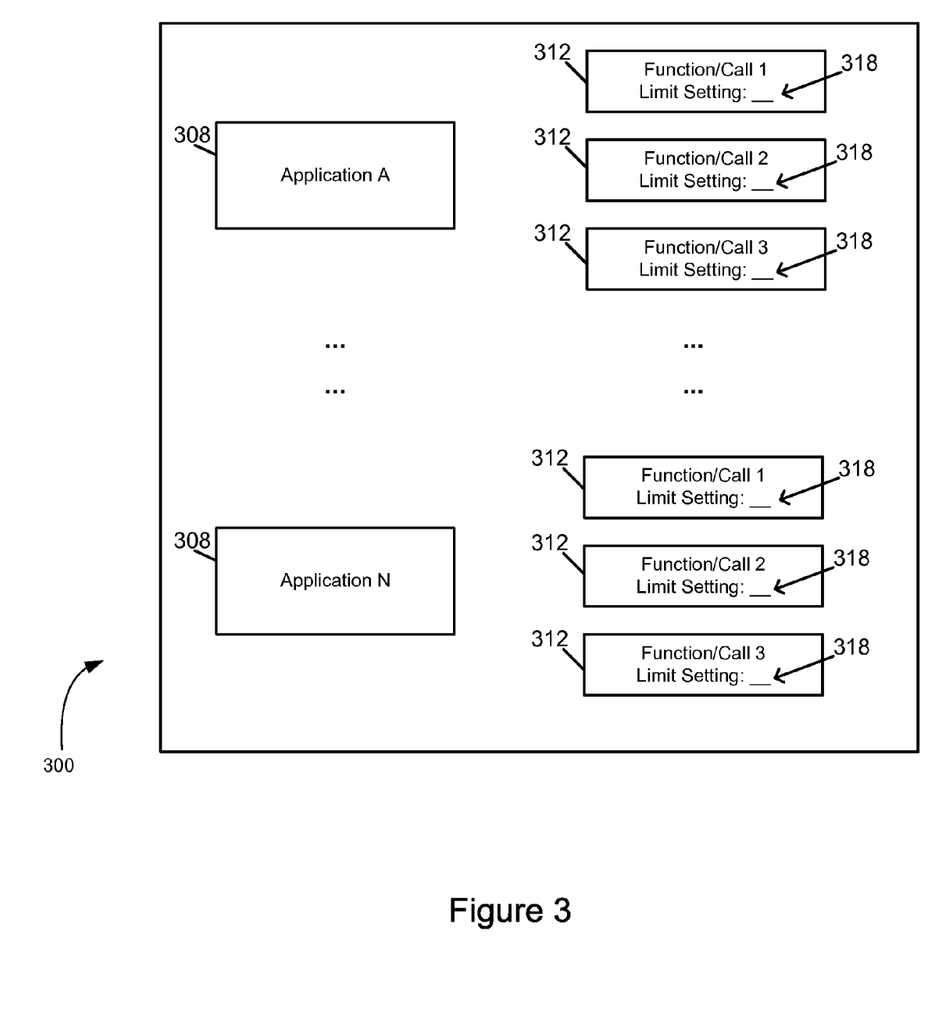
FIG. 3 is a diagram illustrating an exemplary user interface that may be used by a merchant or merchant service provider to set limits or another form of constraint on the calls or requests made by the merchant to data processing services provided by the merchant service provider, in accordance with some embodiments of the present invention.

In order to facilitate the setting of a limit, constraint, or other condition, a user interface may be provided to a merchant, the service provider, or both. FIG. 3 is a diagram illustrating an exemplary user interface 300 that may be used by a merchant or merchant service provider assign limits or another form of constraint to the calls or requests made by the merchant to data processing services provided by the merchant service provider. Note that while the following description relates to the assigning of a limit to the calls or requests to a service provider that originate from a merchant or merchants, embodiments of the invention may also be used to set a limit or constraint on the messages sent to a merchant or merchants by the service provider (e.g., to limit the number or rate of advertisements or reply messages) to enable the merchants to control the allocation of their own data processing resources.

As shown in the figure, the interface 300 can be provided to each merchant. The interface 300 displays a list of merchant-side applications 308 of the merchant that send requests or calls to the service provider. The applications 308 are identified as "Application A", . . . "Application N" in the figure. For each application 308, the interface 300 displays, as indicated at 312, a corresponding set of functions, calls, operations, etc. that may generate a request for services of the service provider, along with a field or region, as indicated at 318, in which to specify a desired limit.

A user (either the merchant or service provider) may enter a desired value for the limit at 318 for each specified function, call, or operation 312 for each application 308 identified by the user interface 300. Thus, in some embodiments, the user interface 300 may be provided to a merchant in order to enable the merchant to specify the limit or constraint values based on their understanding of the operation of their applications. As the merchant is most familiar with the standard operation of their applications, they are in a position to know what level or type of calls or requests are typical in the course of normal operations and what level would suggest a malfunction in their operations, or that an attack by a malicious agent was in progress. In addition, even in the absence of a malfunction or attack by a malicious agent, a merchant may want to establish limits on how the data processing services of the service provider are allocated to the merchant's requests. For example, a merchant may desire that a relatively low number of requests for reports be accepted before subsequent requests are rejected to ensure that the processing of payment transactions (or another higher priority service) is not impacted. In some embodiments, the service provider may access the user interface 300 and enter some or all of the information into it based on data received from the merchant.

Figure 4:
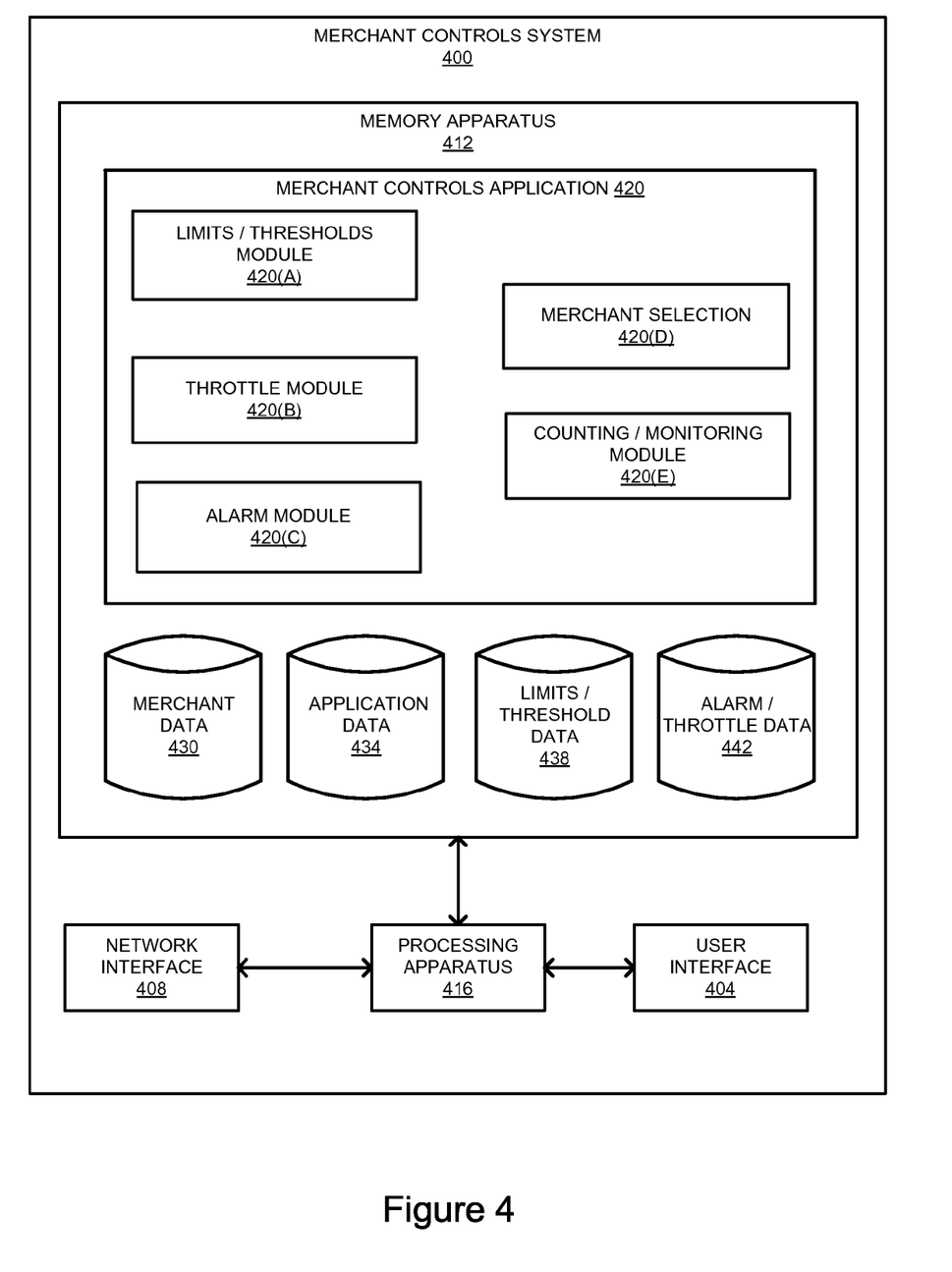
FIG. 4 is a block diagram of components of a merchant controls system, in accordance with some embodiments of the present invention.

It will be helpful to have reference to an example merchant controls system 400 in accordance with at least one embodiment. According to embodiments, the merchant controls system can be implemented by a merchant service provider (e.g., 106, 216) for assigning limits or other forms of constraint to the calls or requests made by merchants (e.g., 104, 204) to the merchant service provider, generating alerts, and, if desired, taking other actions, such as rejecting calls or requests, in the event that limits are exceeded. FIG. 4 provides a block diagram of one such example merchant controls system 400. The merchant controls system 400 comprises a user-interface apparatus 404, a network-interface apparatus 408, and a memory apparatus 412 operatively coupled to a processing apparatus 416.

As described in greater detail below, embodiments of the merchant controls system 400 are generally configured to provide controls for preventing requests or calls from merchants' merchant-side applications from having a negative impact on higher priority services provided by merchant service providers. In this regard, according to at least some embodiments, the merchant controls system 400 may be owned, maintained, operated by, and/or operated on behalf of institutions such as those that provide electronic payment and risk management services to merchants. The merchant controls system 400 may, in some embodiments, be integrated with other systems and environments of such institutions and may share at least some hardware, software, and/or other resources with such other systems and environments. Further, the merchant controls system 400 may, in some embodiments, be integrated with other systems and environments, such as environments 100, 200, and may share at least some hardware, software, and/or other resources with such other systems and environments.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 4 illustrates the user interface 404, network interface 408, memory apparatus 412, and processing apparatus 416 as separate blocks in the block diagram, these separations may be merely conceptual. In other words, in some instances, the user interface 404, for example, is a separate and distinct device from the processing apparatus 416 and the memory apparatus 412 and therefore may have its own processor, memory, and software. In other instances, however, the user interface 404 is directly coupled to or integral with at least one part of the processing apparatus 416 and at least one part of the memory apparatus 412 and includes the user interface input and output hardware used by the processing apparatus 416 when the processing apparatus 416 executes user input and output software stored in the memory apparatus 412.

As will be described in greater detail below, in one embodiment, the merchant controls system 400 is entirely contained within a user terminal, such as a personal computer or mobile terminal, while, in other embodiments, the merchant controls system 400 includes a central computing system, one or more network servers, and one or more user terminals in communication with the central computing system via a network and the one or more network servers. FIG. 4 is intended to cover both types of configurations as well as other configurations that will be apparent to one of ordinary skill in the art in view of this disclosure.

The user interface 404 includes hardware and/or software for receiving input into the merchant controls system 400 from a user and hardware and/or software for communicating output from the merchant controls system 400 to a user, such as a system administrator, or a merchant accessing its account, such as via the Internet. In some embodiments, the user interface 404 includes one or more user input devices, such as a keyboard, keypad, mouse, microphone, touch screen, touch pad, controller, and/or the like. In some embodiments, the user interface 404 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 408 is configured to send and receive electronic data to and from other entities, such as merchant systems in the environments 100 and 200. For example, the network interface 408 comprise one or more application programming interfaces (APIs), which function to "expose" certain processing capabilities of the merchant service provider (e.g., 106, 216) to merchants. As shown in FIG. 4, the network interface 408 enables merchants to access the functionality (or cause the execution) of the merchant controls applications 420, as well as other applications (no shown in FIG. 4) provided by the merchant service provider, such as payment transaction processing applications, transaction report generation applications, customer profile applications, risk assessment applications, etc.

The processing apparatus 416 includes circuitry used for implementing communication and logic functions of the merchant controls system 400. For example, the processing apparatus 416 may include a digital signal processor device, a microprocessor device, and various analog-to-digital converters, digital-to-analog converters, and other support circuits. Control and signal processing functions of the merchant controls system 400 are allocated between these devices according to their respective capabilities. The processing apparatus 416 may include functionality to operate one or more software programs based on computer-readable instructions thereof, which may be stored in the memory apparatus 412. As described in greater detail below, in one embodiment of the invention, the memory apparatus 412 includes a merchant controls application 420 having modules 420(A)-(E) stored therein for instructing the processing apparatus 416 to perform one or more operations of the procedures described herein and in reference to FIG. 5 as well as to FIGS. 1-3, for example. Some embodiments of the invention may include other computer programs stored in the memory apparatus 412. Examples of such applications are shown in FIG. 2 at 230 as being "Payment Transaction Processing", "Transaction Report Generation", "Access Customer Profile" and "Other Processing Functions".

In general, the memory apparatus 412 is communicatively coupled to the processing apparatus 416 and includes at least one non-transitory computer-readable storage medium for storing computer-readable program code and instructions, as well as datastores containing data and/or databases. More particularly, the memory apparatus 412 may include volatile memory, such as volatile Random Access Memory (RAM) including a cache area for the temporary storage of data. The memory apparatus 412 may also include non-volatile memory that can be embedded and/or may be removable. The non-volatile memory can, for example, comprise an EEPROM, flash memory, or the like. The memory apparatus 412 can store any of a number of pieces of information and data used by the merchant controls system 400 to implement the functions of the merchant controls system 400 described herein.

In the illustrated embodiment, the memory apparatus 412 includes data stores containing merchant data 430, application data 434, limits/threshold data 438, and alarm/throttle data 442.

According to some embodiments, the merchant data 430 includes information about each of the merchants that have a relationship with merchant service provider. The merchant data 430 may include information such as specification data regarding the merchant's systems and applications so that the merchant service provider can configure its systems and application to communication with those of the merchant, as well as other data necessary to provide services to the merchant. For example, if the merchant service provider processes payment transactions on behalf of the merchant, the merchant data 430 includes data such as the information for the merchant's deposits account, the merchant's history of transactions, information necessary to withhold taxes from purchase transactions, information necessary to provide fraud detection screens on purchase transactions, and any other data that would be apparent to those having ordinary skill in the art.

According to some embodiments, the application data 434 includes data relevant to merchant applications that send requests to the merchant service provider. For each merchant, the application data 434 may include a list of applications, such as applications 208, that are run or executed by the merchant. The application data 434 may also include data relevant to the set of functions, calls, operations, etc. associated with each application.

According to some embodiments, the limits/threshold data 438 includes data relevant to the limits or thresholds assigned to applications and/or functions of the applications. For each application of each merchant, the limits/threshold data 438 may include one or more limits, thresholds, or other constraints that the merchant assigned to the application. The one or more limits, thresholds, or constraints may be the number, rate, etc of calls or requests that the associated application is permitted to send to the merchant service provider. Further, the limits/threshold data 438 may include limits, thresholds, or constraints for the individual functions, operations, etc of the applications.

According to some embodiments, the alarm/throttle data 442 includes alert preferences of the merchant. This includes data relevant to actions to be taken in the event the number of requests or calls from an application or function exceeds its assigned request limit. For each application and function, the alarm/throttle data 442 indicates whether and to whom to send an alarm. For example, the alarm may be sent to both the merchant and to the merchant service provider in the form of an email, telephone call, text message, etc. Further, for each application and function, the alarm/throttle data 442 includes merchant preferences that indicate whether to reduce, delay the processing of, or reject future calls or requests from an application or function once its assigned request limit has been exceeded.

In some embodiments, merchant data 430, application data 434, limits/threshold data 438, and alarm/throttle data 442 may be received in a number of ways, including but not limited to receiving from a merchant through electronic communication with devices and external data sources via the network interface 408, from users and administrators via the user interface 404, etc.

For the sake of clarity and ease of description, the figures provided herein generally illustrate the merchant data 430, application data 434, limits/threshold data 438, and alarm/throttle data 442 as each being separate from one another. However, it will be understood that, in some embodiments, these data stores may be combined or the data described as being stored within such data stores may be further separated into additional data stores.

As further illustrated by FIG. 4 and as briefly mentioned above, the memory apparatus 412 also includes the merchant controls application 420. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, the merchant controls application 420 includes computer-readable instructions for instructing the processing apparatus 416 and/or other devices to perform one or more of the functions described herein, such as one or more of the functions described in FIG. 5 as well as in FIGS. 1-3.

Figure 5:
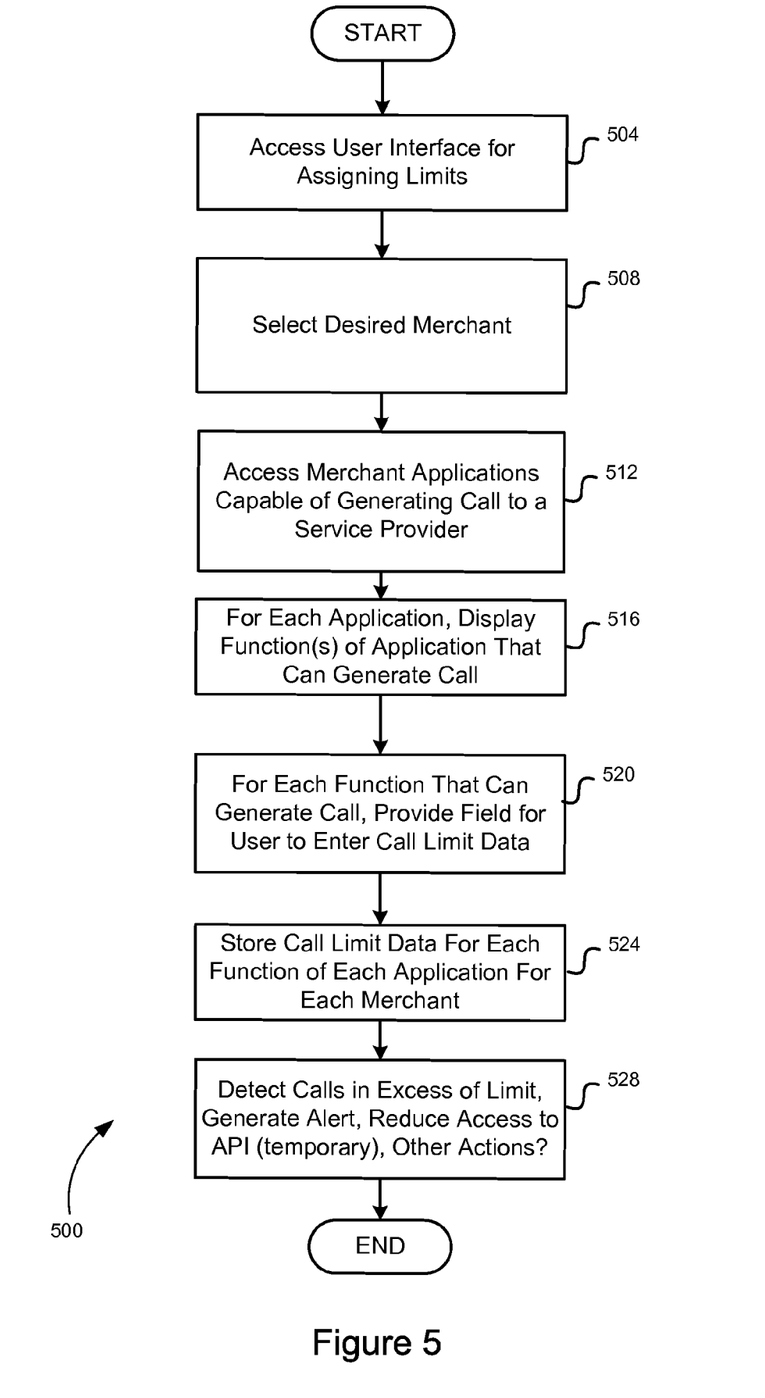
FIG. 5 is a flowchart or flow diagram illustrating an exemplary process for setting a limit or another form of constraint on the calls or requests made by a merchant to data processing services provided by an merchant service provider and generating an alert (and if desired, taking other actions) in the event that the limit is exceeded, in accordance with some embodiments of the present invention.

FIG. 5 is a flowchart or flow diagram illustrating an exemplary process 500 for assigning a limit or another form of constraint to the calls or requests made by a merchant to data processing services provided by an merchant service provider and generating an alert (and if desired, taking other actions) in the event that the limit is exceeded. As shown in the figure, the process 500 generally begins by either a merchant or the service provider accessing a user interface that may be used to configure (e.g. specify, assign, set, etc) the limits or throttling parameters (stage 504). The parameters represent a constraint on the number, rate, or other characteristics of the calls or requests that a merchant's applications (or particular functions of those applications) may make to the service provider via one or more APIs.

According to some embodiments, the user interface is provided by the merchant controls system 400. For example, in the context of providing the interface over the Internet, the user interface 404 could be a Web server for receiving requests from client devices of users' (e.g., merchants or the merchant service provider) and serving content in response.

The user interface 404 could provide access control services and generate content such as text, graphics, audio, and/or video to be transferred to the user in the form of HTML, XML, or another appropriate structured language. In some embodiments, the handling of all requests and responses, as well as the delivery of content between users and the merchant controls system 400, is handled by the user interface 404. For networks other than the Internet, the user interface 404 could be an alternative device serving the purpose of providing an interface to merchants and/or merchant service providers, as would be apparent to one of ordinary skill in the art.

In some embodiments, the user interface may then be used to select the merchant of interest, for whom the limits or constraints will be set (stage 508). For example, this step may be used by a service provider who is entering the limit or constraint data for a plurality of merchants. Similarly, it may be used by a merchant who is accessing a user interface provided by the service provider to enter their name or identification so that the service provider system can properly store the data that the merchant inputs to the user interface. For example, a merchant or merchant service provider may access the merchant controls system 400 and via the user interface 404 and invoke the merchant selection module 420 (D) to select the appropriate merchant or merchants from the merchant data 430.

Next, the user interface may display a set of applications that the merchant runs or executes and that are capable of generating a call or request to the merchant service provider, such as through an API of the merchant service provider (stage 512). This set of applications may be presented in any suitable manner, such as the interface 300 of FIG. 3, and may be obtained from the application data 434. For each application shown, the user interface may display a list of one or more functions that is capable of generating a call or request to the service provider (stage 516). For each function that can generate a call or request, the user interface may display a field or other suitable data entry mechanism for the user to enter the limit or constraint for that function's calls (stage 520). The call limit or constraint data for each function of each application for each merchant is then stored in a suitable data storage element that may be accessed by the service provider (stage 524). For example, the limits/threshold module 420(A) of the merchant controls application 420 may obtain limits/threshold data from the user via the interface 404 and then store said data in the limits/threshold data 438.

During operation of the service provider's data processing services, the number of calls or requests received through the service provider's API(s) are monitored. This may be accomplished by processing the incoming request messages (which would typically be from multiple sources) to identify one or more of (a) the source of the message (the particular merchant); (b) the merchant application generating the request (or the service provider application being requested to perform a task); and (c) the specific application function generating the request or to which the request is directed. With reference to FIG. 4, to monitor calls or requests received at the merchant service provider, the counting/monitoring module 420(E) of the merchant controls application 420 processes the calls or requests as specified above as the calls or requests are received at the network interface 408.

In some embodiments, for a specified merchant, if the number received from a specific function of a specific application of that merchant exceeds the limit or constraint, then an alert may be generated (stage 528). The alert may be provided to the merchant to inform the merchant of a possible malfunction or attack by a malicious entity. For example, the alarm module 420(C) of the merchants control application 420 accesses the alarm/throttle data 442 to determine the alert preferences of the merchant (e.g., email, phone call, text, etc) and sends the alarm over the appropriate channel via the network interface.

In addition, the processing of calls or requests from that merchant, from that merchant application, or from that function of that merchant application may be delayed, temporarily suspended (such as by rejecting subsequent calls, resulting in an error message), terminated pending further investigation, or be subject to any suitable remedial or corrective action. For example, the throttle module 420(B) of the merchants control application 420 accesses the alarm/throttle data 442 to determine whether to the merchant preferences specify action beyond sending an alarm, such as delaying, rejecting, reducing, or otherwise throttling the excessive calls or requests. If further action is requested, the throttle module 420(B) executes the action.

Note that the limits or constraints that are applied may take any suitable form, such as a number, a range of numbers that results in generation of an alert if the number of calls falls outside of the range, a lower and an upper threshold such that one action occurs if the number of calls exceeds the lower value and a second action occurs if the number of calls exceeds the upper value, a combination of factors that must be satisfied to generate an alert, a relationship between one or more functions or applications that must be satisfied to generate an alert (e.g., a first function of a first application must exceed X calls and a second application must exceed Y calls, a first function of a first application must exceed X calls and a second function of the first application must exceed Y calls, etc.). Further, the generation of an alert may be dependent upon a certain rate of calls to a higher priority service provided by the service provider (e.g., if the number of calls for transaction processing is below X, then one set of limits applies for calls from (or to) other applications or functions, while if the number of calls for transaction processing is above X, then a different set of limits applies for calls from (or to) other applications or functions). For example, in most cases a merchant (and the service provider) will desire that the processing of payment transactions be given a higher priority than the servicing of calls for generating reports or performing other lower priority activities.

In some embodiments, one or more functions, methods, operations, or processes of the invention may be implemented by executing a set of instructions, codes, or scripts (or the equivalent) using a server, computer, or other data processing device. Such a server, computer, or other data processing device typically includes a processing element, central processing unit (CPU), microprocessor, or other element operative to execute a set of instructions. The processing element is typically programmed with a set of instructions or code stored in a suitable data storage or memory. When the instructions or code are executed by the programmed processing element, the device containing the processing element operates to perform one or more of the processes, operations, or methods that are part of the present invention. The data storage element may also store data that is used by the processing element to perform the inventive processes, operations, or methods.

Figure 6:
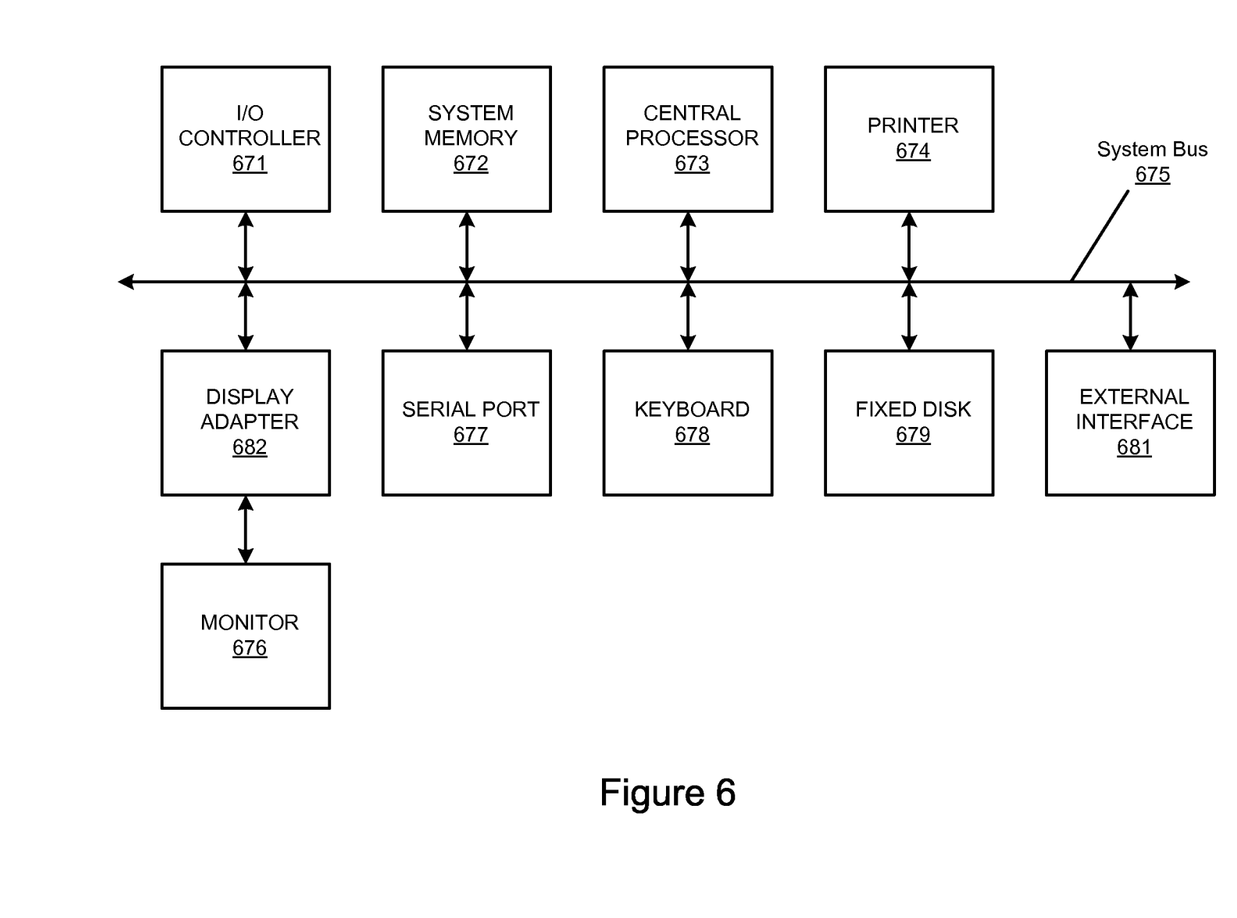
FIG. 6 is a block diagram of elements that may be present in a computing device or system configured to execute a method or process, in accordance with some embodiments of the present invention.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 6. The subsystems shown in FIG. 6 are interconnected via a system bus 675. Additional subsystems such as a printer 674, keyboard 678, fixed disk 679 (or other memory comprising computer readable media), monitor 676, which is coupled to display adapter 682, and others are shown. Peripherals and input/output (I/O) devices, which couple to I/O controller 671, can be connected to the computer system by any number of means known in the art, such as serial port 677. For example, serial port 677 or external interface 681 can be used to connect the computer apparatus to a wide area network such as the Internet, a mouse input device, or a scanner. The interconnection via system bus 675 allows the central processor 673 to communicate with each subsystem and to control the execution of instructions from system memory 672 or the fixed disk 679, as well as the exchange of information between subsystems. The system memory 672 and/or the fixed disk 679 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of processing requests at a merchant service provider system, the requests received from merchant-side applications of a merchant, the method comprising:
   providing, by the merchant service provider system, the merchant with an interface having controls;
   receiving an input selecting at least one of the merchant-side applications of the merchant, wherein the controls of the interface permit the merchant to select the at least one of the merchant-side applications of the merchant;
   receiving an input assigning a limit on a number of requests from the at least one of the merchant-side applications of the merchant that the merchant service provider system will process, wherein the controls of the interface permit the merchant to assign the limit on the number of requests from the at least one of the merchant-side applications of the merchant that the merchant service provider system will process;
   enabling, by the merchant service provider system, the merchant to allocate data processing resources of the service provider system to higher-priority services by permitting the merchant to assign lower limits on the number of requests for lower-priority services that the merchant service provider system will process;
   storing the limit assigned to the at least one of the merchant-side applications of the merchant in a data storage element accessible by the merchant service provider system;
   monitoring, by the merchant service provider system, incoming requests from the merchant-side applications of the merchant, wherein the monitoring includes:
   processing the incoming requests from the merchant-side applications;
   identifying merchant-side application that generated each incoming request; and
   counting the incoming requests from the at least one of the merchant-side applications of the merchant; and
   generating, by the merchant service provider system, an alert if the number of requests from the at least one of the merchant-side applications exceeds the limit.

2. The method of claim 1, wherein each of the merchant-side applications comprises one or more functions and the controls of the interface permit the merchant to assign the limit on the number of requests from at least one of the one or more functions that the merchant service provider system will process.

3. The method of claim 2, further comprising:
   counting, by the merchant service provider system, incoming requests from the one or more functions of the merchant-side applications; and
   generating, by the merchant service provider system, an alert if the number of requests from the at least one of the one or more functions exceeds the limit.

4. The method of claim 3, wherein the alert is provided to the merchant and to an operator of the merchant service provider system.

5. The method of claim 3, wherein the number of incoming requests is determined on a configurable sampling interval.

6. The method of claim 1, further comprising enabling, by the merchant service provider system, the merchant to use the merchant service provider system to receive the alert when a merchant-side application malfunctions by permitting the merchant to set the limit on the number of requests from the merchant-side application equal to a threshold number of requests that the merchant-side application can make without malfunctioning.

7. A non-transitory computer-readable storage medium, comprising:
   program code for providing a merchant with an interface having controls;
   program code for receiving an input selecting at least one of the merchant-side applications of the merchant, wherein the controls of the interface permit the merchant to select the at least one of the merchant-side applications of the merchant;
   program code for receiving an input assigning a limit on a number of requests from the at least one of the merchant-side applications of the merchant that the merchant service provider system will process, wherein the controls of the interface permit the merchant to assign the limit on the number of requests from the at least one of the merchant-side applications of the merchant that the merchant service provider system will process;
   program code for enabling the merchant to allocate data processing resources of the service provider system to higher-priority services by permitting the merchant to assign lower limits on the number of requests for lower-priority services that the merchant service provider system will process;
   program code for storing the limit assigned to the at least one of the merchant-side applications of the merchant in a data storage element accessible by the merchant service provider system;
   program code for monitoring incoming requests from the merchant-side applications of the merchant, wherein the monitoring includes:
   processing the incoming requests from the merchant-side applications;
   identifying merchant-side application that generated each incoming request; and
   counting, the incoming requests from the at least one of the merchant-side applications of the merchant; and
   program code for generating an alert if the number of requests from the at least one of the merchant-side applications exceeds the limit.

8. The computer-readable storage medium of claim 7, wherein each of the merchant-side applications comprises one or more functions and the controls of the interface permit the merchant to assign the limit on the number of requests from at least one of the one or more functions that the merchant service provider system will process.

9. The computer-readable storage medium of claim 8, further comprising:
   program code for counting incoming requests from the one or more functions of the merchant-side applications; and
   program code for generating an alert if the number of requests from the at least one of the one or more functions exceeds the limit.

10. The computer-readable storage medium of claim 7, wherein the alert is provided to the merchant and to an operator of the merchant service provider system.

11. The computer-readable storage medium of claim 7, wherein the number of incoming requests is determined on a configurable sampling interval.

12. The computer-readable storage medium of claim 7, further comprising:
   program code for enabling the merchant to use the merchant service provider system to receive the alert when a merchant-side application malfunctions by permitting the merchant to set the limit on the number of requests from the merchant-side application equal to a threshold number of requests that the merchant-side application can make without malfunctioning.

13. A system comprising a processor, and a memory device coupled to the processor, the memory device comprising code for implementing a method of processing requests at a merchant service provider system, the requests received from merchant-side applications of a merchant, the method comprising:

provided, by the merchant service provider system, the merchant with an interface having controls;

receiving an input selecting at least one of the merchant-side applications of the merchant, wherein the controls of the interface permit the merchant to select the at least one of the merchant-side applications of the merchant;

receiving an input assigning a limit on a number of requests from the at least one of the merchant-side applications of the merchant that the merchant service provider system will process, wherein the controls of the interface permit the merchant to assign the limit on the number of requests from the at least one of the merchant-side applications of the merchant that the merchant service provider system will process;

enabling, by the merchant service provider system, the merchant to allocate data processing resources of the service provider system to higher-priority services by permitting the merchant to assign lower limits on the number of requests for lower-priority services that the merchant service provider system will process;

storing the limit assigned to the at least one of the merchant-side applications of the merchant in a data storage element accessible by the merchant service provider system;

monitoring, by the merchant service provider system, incoming requests from the merchant-side applications of the merchant, wherein the monitoring includes:

processing the incoming requests from the merchant-side applications;

identifying merchant-side application that generated each incoming request; and counting, the incoming requests from the at least one of the merchant-side applications of the merchant; and generating, by the merchant service provider system, an alert if the number of requests from the at least one of the merchant-side applications exceeds the limit.

14. The system of claim 13, wherein each of the merchant-side applications comprises one or more functions and the controls of the interface permit the merchant to assign the limit on the number of requests from at least one of the one or more functions that the merchant service provider system will process.

15. The system of claim 14, further comprising:

counting, by the merchant service provider system, incoming requests from the one or more functions of the merchant-side applications; and generating, by the merchant service provider system, an alert if the number of requests from the at least one of the one or more functions exceeds the limit.

16. The system of claim 13, wherein the method further comprises: enabling, by the merchant service provider system, the merchant to use the merchant service provider system to receive the alert when a merchant-side application malfunctions by permitting the merchant to set the limit on the number of requests from the merchant-side application equal to a threshold number of requests that the merchant-side application can make without malfunctioning.

* * * * *